3,158,646
PROCESS FOR HYDROGENATING 2,5-DICHLORO-3-NITROBENZOIC ACID

Edwin Dorfman, Grand Island, Edward D. Weil, Lewiston, and Robert J. Gruber, Tonawanda Township, N.Y., assignors to Hooker Chemical Corporation, Niagara Falls, N.Y., a corporation of New York
No Drawing. Filed Apr. 17, 1961, Ser. No. 103,254
4 Claims. (Cl. 260—501)

This invention discloses an improved and novel process for preparing a selective organic herbicide. More particularly, this invention describes a process for preparing 3-amino-2,5-dichlorobenzoic acid in higher yields and with less contaminating by-products, than is possible with the presently utilized commercial process of preparation.

The 3-amino-2,5-dichlorobenzoic acid and its salts such as the ammonium and alkali metal salts are valuable and useful as selective herbicides but their use like any commercial herbicide is dependent upon several factors including phytotoxicity, selectivity and cost. While the former two qualities are essential to the selection of a commercial herbicide, cost of production is frequently the dividing line between a commercially available herbicidal compound and a laboratory curiosity. Unfortunately, the most practical and direct method of synthesizing the above named herbicides known is to go through the costly and troublesome reduction of 2,5-dichloro-3-nitrobenzoic acid. This reduction step has several disadvantages which has actually resulted in the curtailment of the product's use as a herbicide. For example, the present process utilizes tin as the reducing agent. Tin is not only a rather costly metal but it can be used only once for a reduction, and its salts contaminate the reduced product, and further complicate the already difficult isolation problem. Obviously, a less expensive reductant such as hydrogen would be more desirable, not only from the cost standpoint, but because, unlike the case of tin, an excess of hydrogen does not contaminate or complicate the isolation procedure. Unfortunately, all past attempts to use hydrogen have been unsatisfactory in that they have resulted in the formation of a significant amount of the herbicidally-inactive and valueless monochlorinated analogs of the deired 3-amino product. Furthermore, this hydrogenation introduces the ancillary and troublesome problem of corrosion, in that hydrogen chloride is produced during this competing reaction. Since the hydrogen chloride is highly corrosive, it substantially reduces the useful life of the autoclave. The reason for this competing and undesirable reduction of the chlorine atoms is their lability. It is well documented in the literature that where a molecule contains a reducible group such as nitro as well as labile chlorine atoms, these labile chlorine atoms are often preferentially hydrogenated instead of the desired groups. This is especially true where the chlorines are labilized by amino groups.

An additional important shortcoming of the prior art reduction is that it almost always requires the use of a relatively costly organic solvent such as an alcohol or ester which because of the expense necessitates recovery and introduces a flammability hazard.

Yet another substantial disadvantage of the prior art reductions of the 2,5-dichloro-3-nitrobenzoic acid is that they require pressure to hydrogenate thereby necessitating the use of expensive and difficult to maintain high-pressure autoclaves.

Unexpectedly, it has been found all of these disadvantages of the prior art can be eliminated or substantially reduced by using the inventive concept and process of hydrogenating an aqueous solution of an ammonium or substituted ammonium salt of 2,5-dichloro-3-nitrobenzoic acid using a catalyst of the noble metal group, consisting of series six and eight group VIII of the Periodic Table.

For example, since hydrogen which is used as a reductant is inexpensive and the reaction is run in water, the cost of reactants is substantially reduced over the prior art especially since the solvent need not be recovered. Similarly, the platinum or noble catalyst in contrast to the tin used in the prior art may be re-used many times and affords a substantial savings.

In addition the heavy capital expenditure of high-pressure equipment is eliminated since the reduction can be conducted at or near atmospheric pressure without significant hydrogenolysis. This is particularly surprising in view of the fact that sodium or other alkali metal salts of 2,5-dichloro-3-nitrobenzoic acid are prone to hydrogenolysis during reduction.

Finally, the competing reduction of the labile chlorine atoms is eliminated through the use of the ammonium or substituted ammonium salts of the 2,5-dichloro-3-nitrobenzoic acid and the production of the herbicidally inactive monochlorinated analogs is no longer a problem. This in turn, eliminates the concomitant and equally troublesome corrosion problem since little or no hydrogen chloride is formed.

While the ammonium salt of 2,5-dichloro-3-nitrobenzoic acid is the preferred starting material for the inventive process because of ease of preparation and cost, the substituted ammonium salts may be satisfactorily employed. Substituted ammonium salts which have been found to satisfactorily include but are not limited to the mono-, di- and trimethylammonium, mono-, di-, and triethlyammonium and other mono-, di-, and trialkylammonium and mono-, di-, and trihydroxyalkyl ammonium salts. The ammonium salt is produced by treating 2,5-dichloro-3-nitrobenzoic acid with the source of a stoichiometric amount of ammonia. The substituted ammonium salts are correspondingly produced by reacting the acid with the corresponding amine.

The catalyst used in this novel process is a noble metal selected from Group VIII, series six and eight of the Periodic Table, consisting of ruthenium, rhodium, palladium, osmium, iridium and platinum. Fortunately, the acquisition cost is relatively unimportant since the catalyst can be used over indefinitely. For reasons of economy, convenience and availability, the preferred catalysts are platinum or palladium on an inert carrier such as carbon.

The hydrogenation of this process is particularly advantageous in that it may be run at pressures only slightly in excess of atmospheric pressure, i.e., 0.2–10 atmospheres of pressure, thus obviating the need for expensive and cumbersome autoclaves. Since high pressure is not a prerequisite, the hydrogenation may be performed efficiently and economically in ordinary chemical processing vessels. When the hydrogenation is run at these lower pressures, the reaction will ordinarily be complete in less than a day. Where time is of the essence and the necessary pressure vessels are available, the reduction can be expeditiously performed at moderately elevated pressure up to several atmospheres at temperatures ranging from zero to one hundred degrees centigrade and above, Preferably from twenty to forty degrees centigrade, in a fraction of the time necessary for the lower pressure reduction. Obviously, the lower temperatures favor a slower reduction and vice versa.

While agitation is not absolutely necessary to the reduction per se, it certainly is desirable in that it assures a smoother reaction through adequate contact of the gas, the solution and the catalyst. The agitation may be supplied through a variety of means, such as an internal magnetic stirring device, a conventional motor or air driven propeller or impeller or in the alternative, by rotating or shaking the containing vessel in a regular or eccesstric pattern.

A preferred product of the inventive process is the ammonium salt of 3-amino-2,5-dichlorobenzoic acid, since it can be used without further modification or purification as a herbicide. Thus, the significant and important cost of isolation and purification is kept to a minimum, which is an all important consideration in the market acceptance of a commercial herbicidal product. Furthermore, the ammonium salt of 3-amino-2,5-dichlorobenzoic acid is the practical equivalent, mole for mole, to the free acid as a herbicide.

The ammonium salt solution may be sprayed as such, optionally with concentration or dilution to the desired level of concentration. It may also be evaporated to dryness and the dry salt used as such. The solution may be impregnated on a solid carrier either powder or granular, and subsequently dried to make a herbicidal formulation which can be applied by a variety of means. The ammonium salt solution may also be admixed with other herbicides particularly the ones which are water soluble.

If desired, the free acid may be isolated by the addition of at least one molar equivalent of a strong acid such as hydrochloric or aqueous sulfuric acid, causing precipitation of the acid which may be isolated by filtration or centrifugation or the like.

*Example 1*

In an appropriate reaction vessel is added two hundred and thirty-six parts by weight of 2,5-dichloro-3-nitrobenzoic acid and eleven hundred and eighty parts by weight of aqueous ammonia (thirty-three percent). The mixture is stirred and warmed to fifty degrees centigrade to effect solution, and the pH adjusted to 7.0 to 9.0 with ammonia. At this point, two percent of activated carbon is added to the solution and it is stirred for one hour. The stirring is stopped and the carbon and adsorbed impurities filtered off.

The ammonium 2,5-dichloro-3-nitrobenzoate solution is added to a hydrogenation vessel equipped for cooling and stirring. Five parts by weight of five percent platinum on carbon is added to the solution and the vessel and gas lines purged first with an inert gas, then hydrogen. The gas lines are then sealed, the agitation started and hydrogen admitted to the vessel at six pounds pressure, while the temperature is maintained at twenty-five to thirty-five degrees centigrade.

In eight hours the reaction is complete, as indicated by an aliquot of the solution, giving only two mole percent of chloride ion by the Volhard titration. The catalyst is filtered off for re-use. The filtrate, consisting of an aqueous solution of ammonium 3-amino-2,5-dichlorobenzoate is suitable as is, for use as a herbicide. For analytical purposes the acid is isolated by adding a stoichiometric amount of hydrochloric acid to an aliquot portion, proving the presence of one hundred and seventy-nine parts by weight (in the total reaction product), of 3-amino-2,5-dichlorobenzoic acid which crystallizes out as a colorless solid.

*Example 2*

A triethylammonium 2,5-dichloro-3-nitrobenzoate solution of pH eight is prepared as in Example 1, except that triethylamine is used instead of ammonia. Six parts by weight of the five percent platinum on carbon catalyst is added and the reduction performed as before, using six pounds gauge hydrogen pressure. The reaction is completed in eighteen hours giving one hundred and twenty parts by weight of triethylammonium 3-amino-2,5-dichlorobenzoic acid and five mole percent of chloride ion.

*Example 3*

Using the procedure and equipment generally followed in Example 1, the reduction is carried out except that methylamine and six percent palladium on carbon are used and the pressure is forty-one pounds of hydrogen by gauge. The temperature is maintained at forty-five degrees centigrade during the nine hours necessary for the reaction to go to completion. The yield is one hundred and sixty parts by weight of product. Analysis showed fourteen mol percent of chloride formed.

*Example 4*

The conditions and equipment set forth in the preceding examples are used except that the sodium salt prepared by reacting two hundred and thirty-six parts by weight of 2,5-dichloro-3-nitrobenzoic acid with an equimolar amount of sodium hydroxide in a sufficient quantity of water is used as starting material for the reduction. The pH of the solution is six, temperature twenty-five degrees centigrade and the hydrogen was introduced at forty-one pounds gauge pressure dropping to sixteen pounds gauge pressure at termination. After nine hours, the hydrogenation was stopped and the solution analyzed. Only a negligible amount of the 3-amino-2,5-dichlorobenzoic acid is found to be present, the primary product being the mono chloro amino benzoic acids.

The significance of the above example is that it demonstrates that the choice of the ammonium salt as to starting material is critical and not a mere matter of convenience.

We claim:

1. The process of preparing salts of 3-amino-2,5-dichlorobenzoic acid comprising the steps of admixing in a closed pressure reactor system a noble metal selected from the group consisting of Group VIII Series 6 and Group VIII Series 8 of the Periodic Table, and a water solution of a salt selected from the group consisting of the ammonium, lower alkylammonium, lower dialkylammonium, lower trialkylammonium and hydroxyalkylammonium salts of 2,5-dichloro-3-nitrobenzoic acid, agitating the above mixture of aqueous salt and noble metal, contacting said admixed and agitated mixture with hydrogen gas under positive pressure until a substantial amount of the corresponding 3-amino-2,5-dichlorobenzoic salt is produced.

2. The process of claim 1 for the production of the ammonium salt of 2,5-dichloro-3-aminobenzoic acid wherein the noble is platinum and the salt in a water solution is the ammonium salt of 2,5-dichloro-3-nitrobenzoic acid.

3. The process of claim 1 for the production of the triethylammonium salt of 2,5-dichloro-3-aminobenzoic acid wherein the noble metal is platinum and the salt in a water solution is the triethylammonium salt of 2,5-dichloro-3-nitrobenzoic acid.

4. The process of claim 1 for the production of the ammonium salt of 2,5-dichloro-3-aminobenzoic acid wherein the noble metal is palladium and the salt in a water solution is the ammonium salt of 2,5-dichloro-3-nitrobenzoic acid.

References Cited by the Examiner

UNITED STATES PATENTS

| | | | |
|---|---|---|---|
| 2,939,881 | 6/60 | Wiegert | 260—501 |
| 2,951,089 | 8/60 | Ginsberg et al. | 260—501 |
| 3,014,063 | 12/60 | McLane et al. | 260—501 |
| 3,051,753 | 8/62 | Dietzler et al. | 260—580 |
| 3,067,253 | 12/62 | Dietzler et al. | 260—518 |
| 3,073,865 | 1/63 | Spiegler | 260—518 |

OTHER REFERENCES

Alford et al.: J. Chem. Soc. (London), 1952 p. 2103, 2106.

Muller: Methoden der Organischen Chemie, 1957 p. 367.

Goldstein et al.: Chem. Abstracts, vol. 52:7209d (1958).

Derwent's Belgian Patent Reports, No. 55B, p. A5, No. 576,810, Aug. 16, 1959.

LORRAINE A. WEINBERGER, *Primary Examiner.*

LEON ZITVER, *Examiner.*